Jan. 10, 1956  R. H. BAUMAN  2,730,205
AUTOMATIC SCREW TYPE BRAKE WEAR ADJUSTOR
Filed Jan. 5, 1954  2 Sheets-Sheet 1
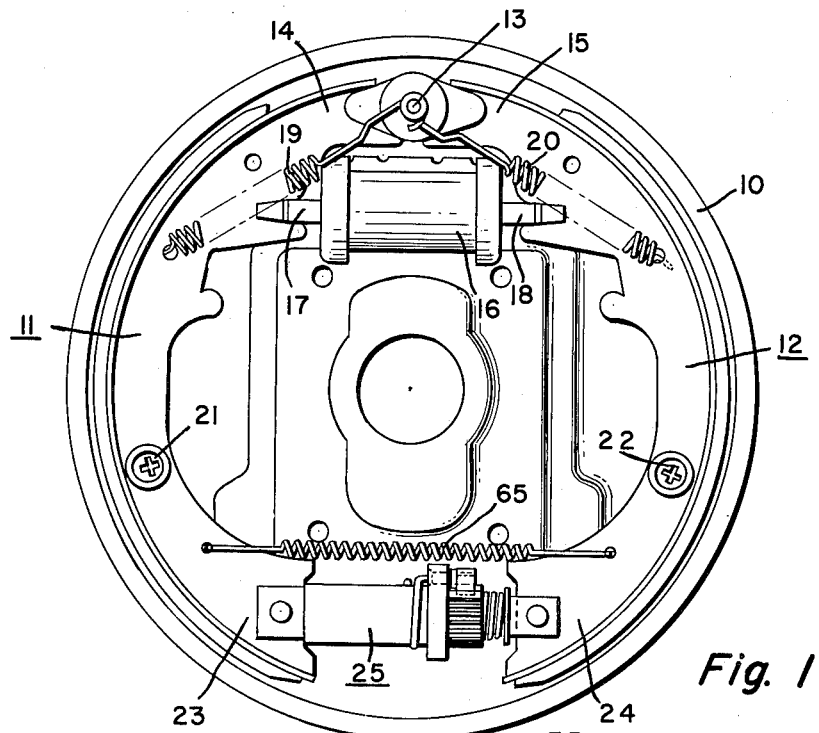
Fig. 1
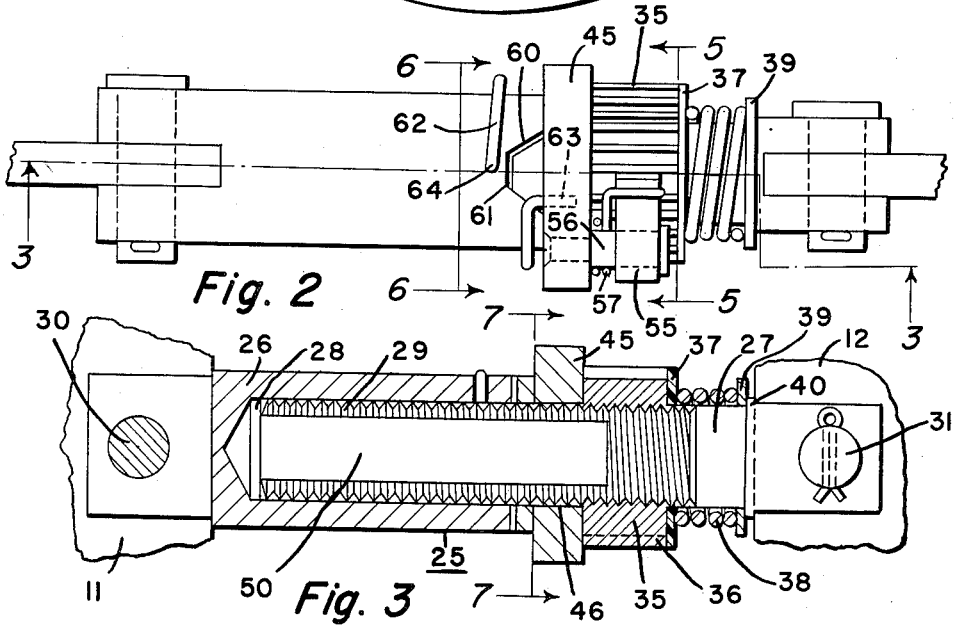
Fig. 2
Fig. 3
INVENTOR.
Robert H. Bauman
BY
Craig V. Montoro
Attorney Jan. 10, 1956  R. H. BAUMAN  2,730,205
AUTOMATIC SCREW TYPE BRAKE WEAR ADJUSTOR
Filed Jan. 5, 1954  2 Sheets-Sheet 2

INVENTOR.
Robert H. Bauman
BY
Craig V. Morrow
Attorney

United States Patent Office 2,730,205
Patented Jan. 10, 1956

2,730,205

AUTOMATIC SCREW TYPE BRAKE WEAR ADJUSTOR

Robert Henry Bauman, Dayton, Ohio, assignor to General Motors Corporation, Detroit, Mich., a corporation of Delaware Application January 5, 1954, Serial No. 402,310

5 Claims. (Cl. 188—196)

This invention relates ot brake structures for automotive vehicles, and particularly to an automatic brake adjusting mechanism to effect adjustment of the brake shoes relative to the brake drum automatically to compensate for wear of the brake linings.

An object of the invention is to provide a simplified brake shoe adjusting device that operates automatically in response to brake shoe movement that effects adjustment between the brake shoe and the brake drum.

Further objects and advantages of the present invention will be apparent from the following description, reference being had to the accompanying drawings wherein a preferred form of the invention is clearly shown.

In the drawings:

Figure 1 is an elevational view of a brake mechanism incorporating a brake adjusting device constructed in accordance with this invention.

Figure 2 is an enlarged elevational view of the brake adjusting device.

Figure 3 is a cross sectional view taken along line 3—3 of Figure 2.

Figure 4:
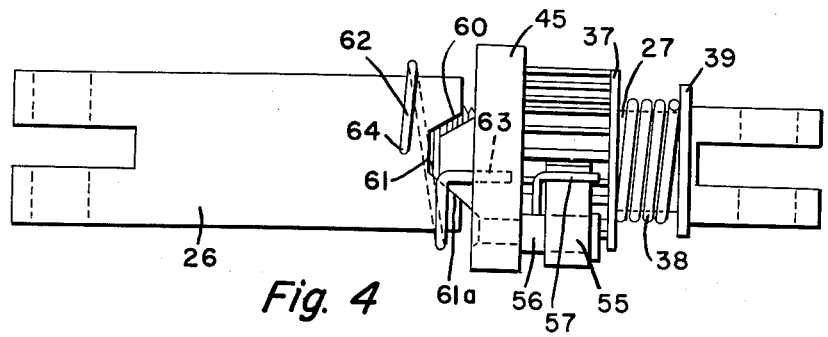
Figure 4 is an elevational view of the brake adjusting device similar to Figure 2 but illustrating the device in an operating position.
Figure 5:
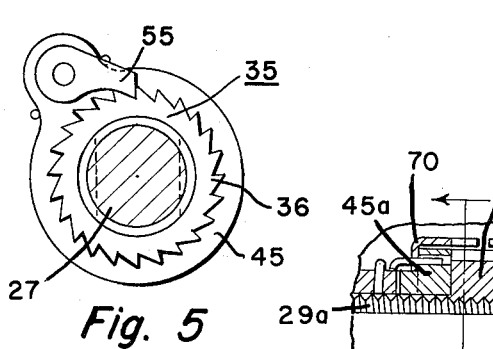
Figure 5 is a cross sectional view taken along the line 5—5 of Figure 2.
Figure 6:
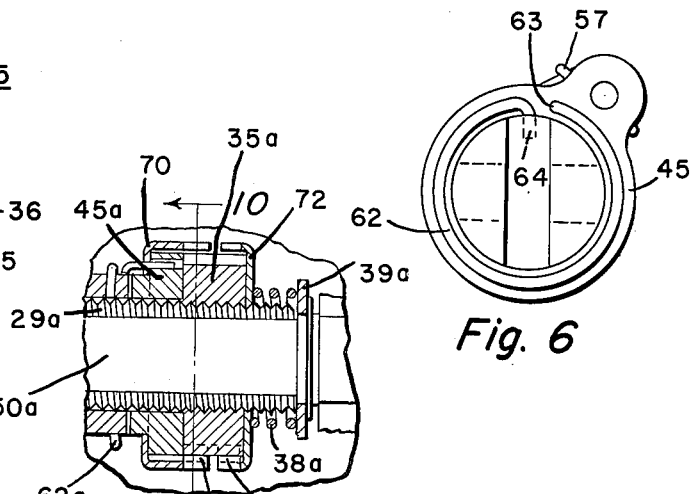
Figure 6 is a cross sectional view taken along line 6—6 of Figure 2.

In this invention the brake structure comprises a brake drum 10 having the brake shoes 11 and 12 positioned therein. An anchor pin 13 is carried upon the usual back plate for the brake structure and is positioned between opposite adjacent ends 14 and 15 of the brake shoes 11 and 12 respectively.

An actuating device 16 comprising the wheel cylinder of a hydraulic brake system is positioned between the brake shoes 11 and 12 for actuation of the brake shoes through means of the plungers 17 and 18 that extend from the wheel cylinder actuating device 16 into engagement with the brake shoes 11 and 12 respectively.

Retraction springs 19 and 20 extend between the brake shoes 11 and 12 respectively and the anchor pin 13.

The brake shoes 11 and 12 are supported upon the usual backing plate by means of spring retainers 21 and 22.

Between the opposite ends 23 and 24 respectively of the brake shoes 11 and 12 there is positioned an abutment device 25. This abutment device 25 provides for automatic adjustment of the brake shoes 11 and 12 relative to the brake drum 10 to compensate for wear of the brake linings carried by the brake shoes.

The abutment device 25 comprises a first member 26 and a second member 27 that telescope so that the member 26 supports the member 27.

The member 26 has an axially extending bore 28 that receives the threaded end 29 of the member 27. The member 26 is attached to the brake shoe 11 by means of a pivot pin 30. The member 27 is correspondingly attached to the brake shoe 12 by means of a pivot pin 31.

The member 27 has the threaded portion 29 carried within the smooth walled bore 28 of the member 26 so that the members 26 and 27 are axially movable relative to one another.

A nut 35 is threadedly received on the threaded portion 29 of the member 27, this nut having ratchet teeth 36 in the periphery thereof. A friction washer 37 engages one face of the nut 35 and is retained in engagement therewith by the compression spring 38 placed between the washer 37 and the washer 39 engaging a shoulder 40 on the member 27. Thus the nut 35 is frictionally resisted from free rotation on the threaded portion 29 of the member 27.

A nut actuating member 45 is placed upon the threaded portion of the member 27 and has a smooth walled bore 46 to allow the actuated member 45 to rotate freely upon the member 27. The smooth walled bore 46 of the actuating member 45 has flat portions 47 and 48 that are adjacent the flat portions 49 and 50 on the member 27. Thus the nut actuating member 45 is freely rotatable upon the member 27 within the limits of the clearance provided between the flat portions 47, 49 and 48, 50. This gives a restrictive degree of rotation to the actuating member 45.

Figure 7:
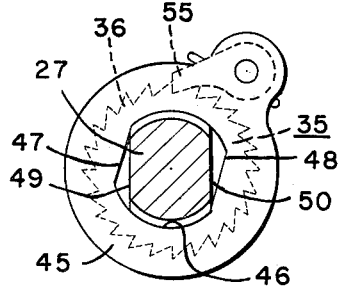
Figure 7 is a cross sectional view taken along line 7—7 of Figure 3.
Figure 8:
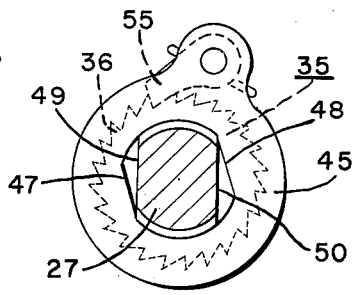
Figure 8 is a cross sectional view like Figure 7 but illustrating the operating mechanism in another operating position.

The actuating member 45 carries a pawl 55 as supported thereon by a stationary pin 56. A torsion spring 57 causes the pawl 55 to engage the teeth 36 on the nut 35 whereby to effect rotation of the nut on the member 27 when the actuating member 45 is oscillated between its maximum position illustrated in Figures 7 and 8. The angle of oscillation of the actuating member 45 is just slightly greater than the distance between adjacent teeth 36 on the nut 35 so that when the full stroke of oscillaion is produced upon the actuating member 45, such oscillation will cause pawl 55 to drop behind the next adjacent tooth for rotational advancement of the nut 35 upon the member 27 and thereby elongate the distance between the pivot pins 30 and 31 connecting the members 26 and 27 to the shoes 11 and 12 respectively. This rotation of the nut 35 effects adjustment of the shoes 11 and 12 relative to the brake drum 10 to compensate for wear of the linings or of the drum.

The actuating member 45 is given its oscillation by means of the cam projection 60 on the actuating member 45 working within the cam recess 61 provided in the member 26. A torsion spring 62 has the end 63 thereof engaging the actuating member 45 and the opposite end 64 engaging the member 26 whereby to continuously urge the cam projection 60 against the slope 61a of the cam recess 61. Thus axial movement of the member 26 relative to the member 27 will effect oscillatory movement of the actuating member 45 relative to the nut 35. When this oscillatory movement becomes greater than the distance between adjacent teeth on the nut 35, the pawl 55 will drop behind the next adjacent tooth on the nut 35 to effect a rotation thereof for axial extension of the members 26 and 27 relative to one another.

A tension spring 65 extends between the ends 23 and 24 of the brake shoes 11 and 12 whereby to hold the member 26 of the adjusting device 25 in maximum telescopic position relative to the member 27. However, the spring 65 is weaker than the retraction springs 19 and 20 so that the ends 23 and 24 of the brake shoes move outwardly relative to one another about the anchor pin 13 as the axis when hydraulic fluid is initially supplied to the wheel cylinder 16. This upward movement of the brake shoes 11 and 12 thereby effects the axial movement between the members 26 and 27 of the adjusting device 25 to render it effective for automatic adjustment of the brake shoes relative to the brake drum.

Figure 9:
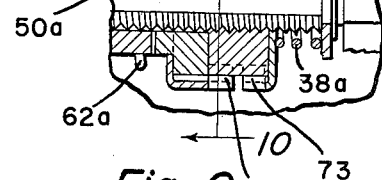
Figure 9 is a cross sectional view illustrating a modified construction of the device.
Figure 10:
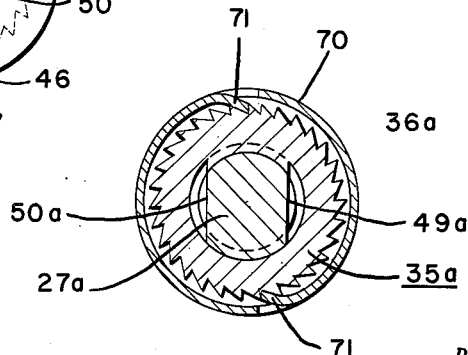
Figure 10 is a cross sectional view taken along line 10—10 of Figure 9.

In Figures 9 and 10 there is illustrated a slightly modified arrangement of the ratchet mechanism heretofore described. In these figures the free member 45a includes a cup-shaped shell 70 that has a ratchet tooth 71 formed thereon. This element operates in exactly the same manner as the free member 45 carried on the ratchet tooth 55 heretofore described with reference to Figure 4.

The friction washer 37 of Figure 4 is in the modification of Figures 9 and 10 replaced with a cup-shaped shell 72 that has a ratchet tooth 73 thereon that prevents rotation of the ratchet wheel 35 in one direction.

The remaining structure of the modified form of the device is the same as that illustrated in Figure 4 and the corresponding parts carry the same reference numerals but with the suffix "a."

While the form of embodiment of the invention as herein disclosed constitutes a preferred form, it is to be understood that other forms might be adopted as may come within the scope of the claims which follow.

What is claimed is as follows:

1. A wear compensating device for a brake structure, comprising, a first member having a longitudinally extending chamber, a second member telescopically received within said first member axially movable therein, said second member having a helical type thread thereon, a nut threadedly received on said second member for rotation thereon, said nut having teeth on its periphery, a nut actuating member positioned between said nut and said first member, a pawl carried on said nut actuating member and engaging said teeth to rotate said nut thereby upon oscillation of said actuating member relative to said nut, and cam means between said actuating member and said first member to effect oscillation of said actuating member and thereby effect rotation of said nut on said second member whereby to extend the total length of said first and second members.

2. A wear compensating device for a brake structure, comprising, a first member having a longitudinally extending chamber, a second member telescopically received within said first member axially movable therein, said second member having a helical type thread thereon, a nut threadedly received on said second member for rotation thereon, said nut having teeth on its periphery, a nut actuating member positioned between said nut and said first member, a pawl carried on said nut actuating member and engaging said teeth to rotate said nut thereby upon oscillation of said actuating member relative to said nut, means engaging said nut to resist rotative movement thereof against said pawl, and cam means between said actuating member and said first member to effect oscillation of said actuating member and thereby effect rotation of said nut on said second member whereby to extend the total length of said first and second members.

3. A wear compensating device for a brake structure, comprising, a first member having a longitudinally extending chamber, a second member telescopically received within said first member axially movable therein, said second member having a helical type thread thereon, a nut threadedly received on said second member for rotation thereon, said nut having teeth on its periphery, a nut actuating member positioned between said nut and said first member, a pawl carried on said nut actuating member and engaging said teeth to rotate said nut thereby upon oscillation of said actuating member relative to said nut, retaining means engaging said nut to resist rotation thereof against said pawl including spring means urging said retaining means against said nut whereby to provide frictional resistance against rotation of said retaining means and thereby resist rotation of said nut, and cam means between said actuating member and said first member to effect oscillation of said actuating member and thereby effect rotation of said nut on said second member whereby to extend the total length of said first and second members.

4. A wear compensating device for a brake structure, comprising, a first member having a longitudinally extending chamber, a second member telescopically received within said first member axially movable therein, said second member having a helical type thread thereon, a nut threadedly received on said second member for rotation thereon, said nut having teeth on its periphery, a nut actuating member positioned between said nut and said first member and including cam means engaging said first member to effect oscillation of said actuating member on relative axial movement between the said actuating member and said first member, a pawl carried on said nut actuating member and engaging said teeth to rotate said nut thereby upon oscillation of said actuating member relative to said nut, and spring means between said nut actuating member and said first member to effect operating engagement of the cam means between said actuating member and said first member.

5. A wear compensating device for a brake structure, comprising, a first member having a longitudinally extending chamber, a second member telescopically received within said first member axially movable therein, said second member having a helical type thread thereon, a nut threadedly received on said second member for rotation thereon, said nut having teeth on its periphery, a nut actuating member positioned between said nut and said first member and including cam means engaging said first member to effect oscillation of said actuating member on relative axial movement between the said actuating member and said first member, a pawl carried on said nut actuating member and engaging said teeth to rotate said nut thereby upon oscillation of said actuating member relative to said nut, and torsion spring means between said nut actuating member and said first member to effect operating engagement of the cam means between said actuating member and said first member by unidirectional urgence of rotation of said actuating member relative to said first member.

References Cited in the file of this patent

UNITED STATES PATENTS

| | | |
|---|---|---|
| 2,230,746 | Gladstone | Feb. 4, 1941 |
| 2,255,260 | Loweke | Sept. 9, 1941 |
| 2,648,996 | MacDougall | Aug. 18, 1953 |